United States Patent
Sioquim et al.

(10) Patent No.: US 10,386,798 B2
(45) Date of Patent: Aug. 20, 2019

(54) SECURING USER INPUT INFORMATION

(71) Applicant: NCR Corporation, Duluth, GA (US)

(72) Inventors: Jason Derequito Sioquim, Victorias (PH); Matthew Kamp, Cumming, GA (US); Cesar Ian Fuentes, Cebu (PH); Bartolome Arcenal, Jr., Mandaue (PH)

(73) Assignee: NCR Corporation, Atlanta, GA (US)

( * ) Notice: Subject to any disclaimer, the term of this patent is extended or adjusted under 35 U.S.C. 154(b) by 442 days.

(21) Appl. No.: 14/673,160

(22) Filed: Mar. 30, 2015

(65) Prior Publication Data
US 2016/0291614 A1 Oct. 6, 2016

(51) Int. Cl.
| | |
|---|---|
| G05D 23/00 | (2006.01) |
| G05B 15/02 | (2006.01) |
| G06Q 20/10 | (2012.01) |
| G07F 19/00 | (2006.01) |
| G06Q 20/40 | (2012.01) |

(52) U.S. Cl.
CPC ......... *G05B 15/02* (2013.01); *G06Q 20/1085* (2013.01); *G06Q 20/40145* (2013.01); *G07F 19/2055* (2013.01)

(58) Field of Classification Search
CPC ............ G06Q 20/1085; G07F 19/2055; G07F 7/1033; G07F 7/10; G07F 19/20; G07F 19/201; G06F 21/83; G06F 21/00; G06F 21/31; G06F 21/70; G06F 21/82; G06F 3/0219; G06F 3/023; G10K 11/175; G10K 11/178; G10K 2210/10; H04K 1/006; H04K 2203/12; H04K 2203/14; H04K 3/45; H04K 3/825
See application file for complete search history.

(56) References Cited

U.S. PATENT DOCUMENTS

| | | | | |
|---|---|---|---|---|
| 4,967,382 A | * | 10/1990 | Hall | G05D 23/1904 165/216 |
| 5,822,997 A | * | 10/1998 | Atterbury | F25B 13/00 62/180 |
| 7,899,325 B2 | * | 3/2011 | Dickson | G06F 21/83 398/40 |
| 8,978,971 B1 | * | 3/2015 | Block | G07F 19/2055 235/375 |
| 2003/0091091 A1 | * | 5/2003 | Patterson | G01K 7/42 374/141 |
| 2008/0072331 A1 | * | 3/2008 | Dickson | G06F 21/83 726/26 |
| 2015/0185863 A1 | * | 7/2015 | Kobori | G06F 21/31 341/22 |

* cited by examiner

*Primary Examiner* — Zhipeng Wang
(74) *Attorney, Agent, or Firm* — Schwegman, Lundberg & Woessner (57) ABSTRACT

Methods, systems and apparatus for securing user input to a terminal such as a self-service terminal. The temperature of one or more keys pressed by a user when entering user information into a terminal (e.g., user PIN) is determined. The change in temperature on the keys' surface from the user touching the keys reflects a heat signature that can be identified by thermal imaging devices. A desired temperature for the keys that will mask the heat signature is determined. The temperature of the keys is adjusted (e.g., raised or lowered) to the desired temperature.

14 Claims, 5 Drawing Sheets

SECURING USER INPUT INFORMATION

BACKGROUND

This disclosure relates to securing user information.

To complete many transactions today, including a host of self-service transactions, users are often required to enter sensitive (or other personal) information into the self-service device. For example, to withdrawal money from an automated teller machine (ATM) a user must typically swipe his or her debit or credit card and enter his or her personal identification number (PIN) through a keypad on the ATM.

Such a process presents an opportunity for bad actors to determine the user's PIN, or other personal information, through various techniques such as, for example, watching the keypad as the user enters the PIN. With the PIN (and account number) in hand, the bad actor may be able to access the user's account and make unauthorized charges or withdrawals.

SUMMARY

In general, the subject matter of this specification relates to securing user information input by a user into a terminal (e.g., the user's PIN) such as, for example, a self-service terminal, kiosk or point-of-sale device. In one implementation, the subject matter herein relates to preventing, or mitigating the risk of, detection of user information by thermal imaging devices based on the heat signature left by users pressing keypad keys or touchscreen virtual buttons when entering such information.

In general, one aspect of the subject matter described in this specification can be implemented in methods that include determining a first temperature of at least a portion of an input device for a self-service terminal. The first temperature reflects a heat signature on the at least a portion of the input device caused by a user's interaction with the input device. Determining a desired temperature for the at least a portion of the input device to mask the heat signature (including determining an ambient temperature for the input device), and adjusting the first temperature to the desired temperature (including adjusting the first temperature to the ambient temperature). In some implementations, the desired temperature is the same as the first temperature and adjusting the first temperature to the desired temperature includes heating or cooling the input device to the desired temperature.

The input device can be a keypad or a touchscreen. In the case of a keypad, the keypad buttons (or simply keys) can be metallic or non-metallic. The self-service terminal can be an ATM, kiosk or POS device.

An aspect of the subject matter described in this specification can be implemented in methods that include determining an occurrence of a user's interaction with an input device for a self-service terminal and, in response to the occurrence of the user's interaction, emitting infrared radiation directed to the input device to mask a heat signature on the input device caused by the user's interaction. In some implementations, the method includes emitting infrared radiation from underneath and through the non-metallic button.

In some implementations, the subject matter described in this specification can be implemented in a system that includes a self-service terminal. The self-service terminal can include an input device configured to accept a user input to facilitate a transaction, a temperature determination device configured to determine temperature information of the input device, and a temperature adjustment device configured to adjust a temperature of at least a portion of the input device to a desired temperature to mask a heat signature on the input device caused by the user input. In some implementations, the temperature determination device is configured to determine a temperature of the at least a portion of the input device resulting from the user input.

In some implementations, the temperature adjustment device comprises a Peltier device (or another thermoelectric device) and is configured to heat and cool the at least a portion of the input device.

Particular implementations of the subject matter described in this specification can be implemented so as to realize one or more of the following advantages. A user's input into a terminal (e.g., an ATM) is protected from "skimming" techniques involving thermal imaging devices whereby bad actors attempt to steal user information based on the heat signature left on the terminal's input device (e.g., a keypad) from the user entering information (e.g., a PIN or other sensitive information). Eliminating or reduces this skimming threat enhances the security of the transaction, and reduces the occurrence of fraudulent transactions by limiting the opportunity for bad actors to acquire sensitive user information needed to carry out the fraudulent transactions. This, in turn, lowers the effective cost of the transaction by reducing the need for mitigation of the fraudulent transactions (e.g., refunding user accounts and investigating such transactions).

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

The present disclosure relates to securing user inputs to a terminal (e.g., ATM, kiosks, self-service check outs, etc.) from skimming by bad actors using thermal imaging devices. More specifically, thermal imaging devices can be used to capture the heat signature left on the terminal's input device (e.g., keypad) when users enter user information (e.g., a PIN). Based on the heat signature left on the keys of the input device by the user, the identity and order of the entry of the characters of the user information can be determined. With this user information, bad actors can perpetrate fraudulent and unauthorized transactions under the user's account (e.g., debit or credit card account).

The heat signature of the keys reflects the temperature change of the keys resulting from the user's touch (e.g., the temperature differential between the various keys). For example, if the user pressed keys 1, 2, 3 and 4, in that order, then, when viewed with a thermal imaging device, the temperature gradient across the keys would show that key 4 had the highest temperature (as it was most recently pressed) followed by key 3, key 2, and key 1 with the lowest temperature (as it was pressed first in time). As compared with the non-pressed keys (e.g., 0, 5, 6, 7, 8, and 9), the pressed keys would all have a higher temperature (because of heat transfer from the user's touch).

This specification describes various ways to combat such unauthorized disclosures. One technique to prevent or reduce the likelihood of skimming by thermal imaging devices involves adjusting the temperature of keys of the terminal's input device to mask the heat signature left by the user. For example, if the user's touch on a key raises the temperature on that key with respect to other keys, thereby leaving a heat signature detectable by the thermal imaging device, the systems and methods herein can quickly lower the key's temperature back to the ambient temperature (e.g., the temperature of the other keys) such that the thermal imaging device does not show a hot spot on the depressed key reflecting that it was pressed by the user. If all the keys are at the same temperature, the bad actor, though the output of the thermal imaging device, cannot determine which keys were pressed/touched and, thus, cannot skim the user information. Likewise, if the user's touch on a key lowers the temperature on that key with respect to other keys, the systems and methods herein can quickly raise the key's temperature back to the ambient temperature to eliminate or reduce the heat signature from the touch.

Another technique disclosed herein for preventing skimming through use of thermal imaging devices concerns emitting light in a spectrum and manner that blinds the thermal imaging device. For example, thermal imaging devices typically detect heat signatures through the infrared spectrum. Thus a radiation emitting device (e.g., an infrared emitter or light emitting diode) flooding the keypad region of the terminal effectively blinds the imaging device by obscuring the thermal/temperature gradients across the keypad. Without these the thermal/temperature gradients the bad actor cannot skim the user information with the thermal imaging device. The operation of the terminal is described below with reference to FIG. 1.

Figure 1:
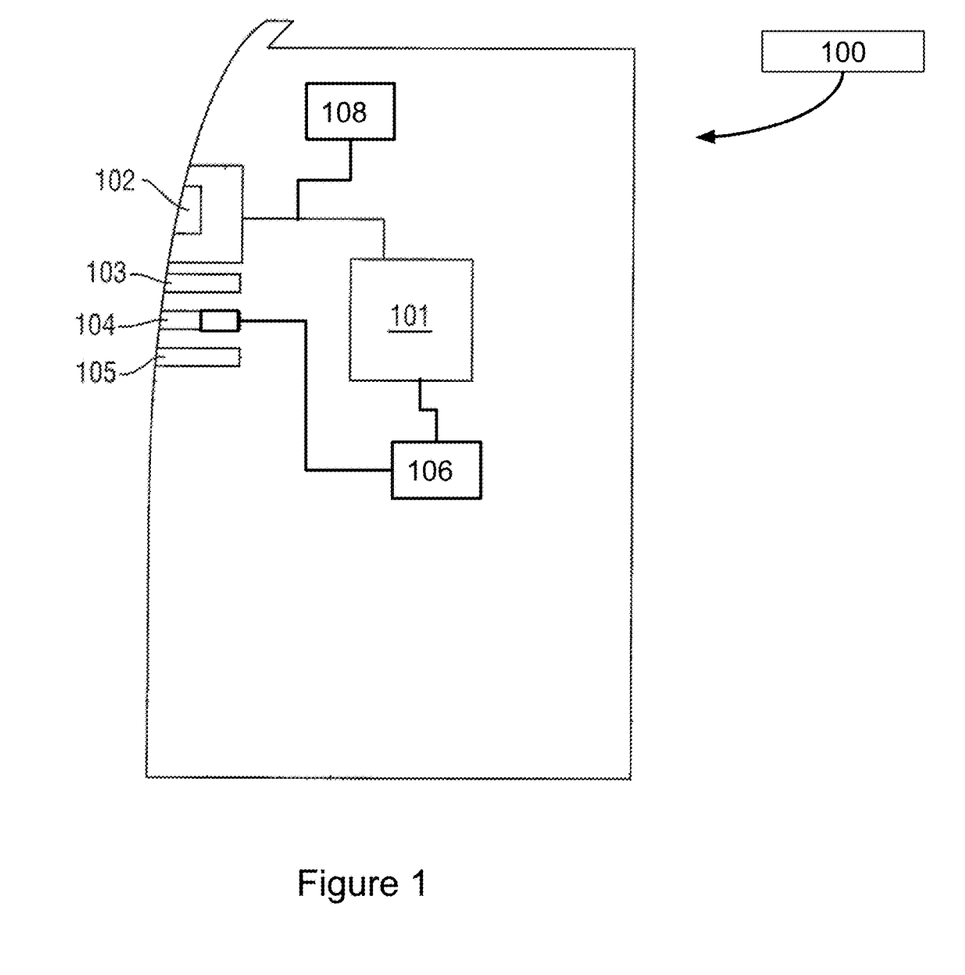
FIG. 1 is a block diagram of an example terminal in which an enhanced security system can be implemented.

FIG. 1 is a block diagram of an example terminal 100 in which an enhanced security system can be implemented. The terminal 100 can be, for example, an ATM, a kiosk, a point-of-sale terminal or another type of terminal through which users can input information (e.g., self-service terminal).

The terminal 100 includes different modules for enabling transactions or functions to be executed by the terminal 100. For example, these modules can include one or more the following: a controller 101 (e.g., a data processing apparatus) that manages, coordinates, and/or performs the tasks to carry out the terminal's functions, a display 102 for providing a graphical user interface to the user of the terminal 100, a card reader/writer module 103 for reading and/or writing to cards such as debit and credit cards, an input device 104 for accepting user inputs such as a user's PIN, a receipt printer module 105 for printing receipts of any transactions performed by the terminal 100, a temperature determination device 106 to determine temperature information of the input device 104, and a temperature adjustment device 108 to adjust a temperature of the input device 104 to mask a heat signature on the input device 104 caused by the user input. In part, the temperature determination device 106 and the temperature adjustment device 108 are used by the terminal 100 to secure user information from theft by thermal imaging devices, as explained below with reference to FIGS. 2A and 2B.

Figure 2A:
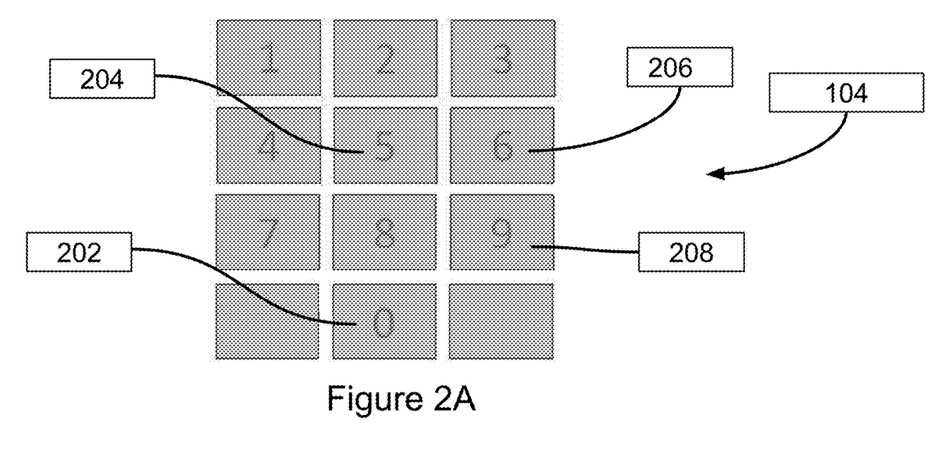
FIGS. 2A and 2B are illustrations of an example input device.
Figure 2B:
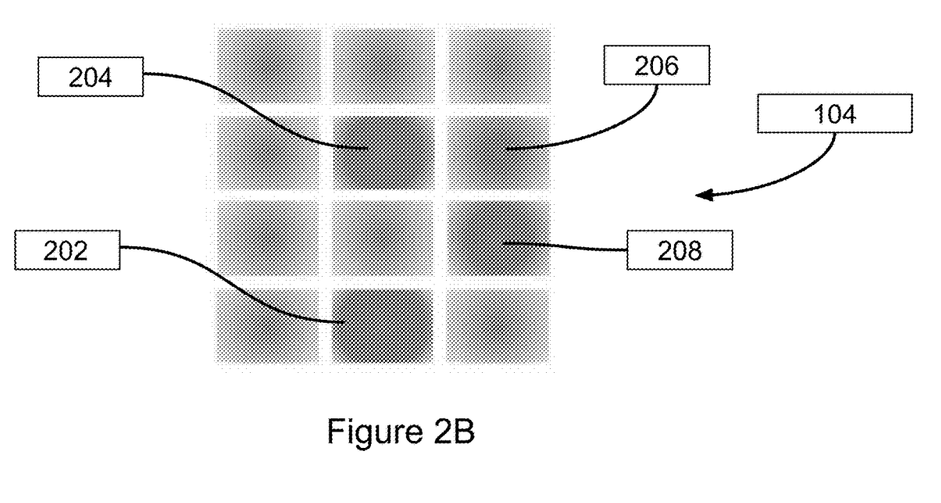

FIGS. 2A and 2B are illustrations of an example input device 104. An input device 104 can be, for example, a keypad or touchscreen or another device that can receive user touch inputs. FIG. 2A depicts a keypad 104 with ten digits (i.e., 0-9) including 0 (202), 5 (204), 6 (206), and 9 (208), although an input device 104 can include additional or different characters. For example, an input device 104 can include some of all of those characters from a QWERTY keyboard.

FIG. 2B depicts an image of the keypad input device 104 generated by a thermal imaging device (e.g., infrared imaging device). For example, FIG. 2B depicts a heat signature of the keypad after a user entered a four-digit PIN. In this example, the PIN was 6950. This is reflected by the exaggerated circular patterns on the respective PIN digit keys (i.e., 0 (202), 5 (204), 6 (206), and 9 (208)). More specifically, each of the circular patterns reflected on the PIN digit keys are larger than those of any of the other key because in pressing the corresponding PIN keys the user transferred heat from his/her finger to the key (e.g., input device button) thereby raising the temperature of the key. The further in time from the actual key touch, the effects on the key touch lessen such that at some point in time after the touch the key temperature approaches and eventually returns to its natural state (the temperature of the key prior to the touch, e.g., steady-state temperature prior to the touch). For example, after one minute from the key touch, only ten percent of the transferred heat energy from the touch may remain, as the remaining transferred heat has dissipated. Intuitively this makes sense as the heat from the touch is transferred out of the key to the surrounding area until the key and the surrounding area reach their steady state temperature(s) as dictated by the laws of thermodynamics.

In FIG. 2B, the larger the circular pattern on the key the more recent the key touch. Thus, for the four keys showing a recent touch, the order of the PIN digits are 6 (206), 9 (208), 5 (204) and 0 (202) because 6 (206) reflects the smallest of the recent heat signatures/circular patterns (i.e., least recent touch or first in time touch) and 0 (202) reflects the largest of the recent heat signatures/circular patterns (i.e., most recent touch or last in time touch), with 9 (208) and 5 (204) respectively slotted in between. In this way, user information input with an input device can be detected through use of a thermal imaging device. Securing such user inputs is described below with reference to FIGS. 3A and 3B.

Figure 3A:
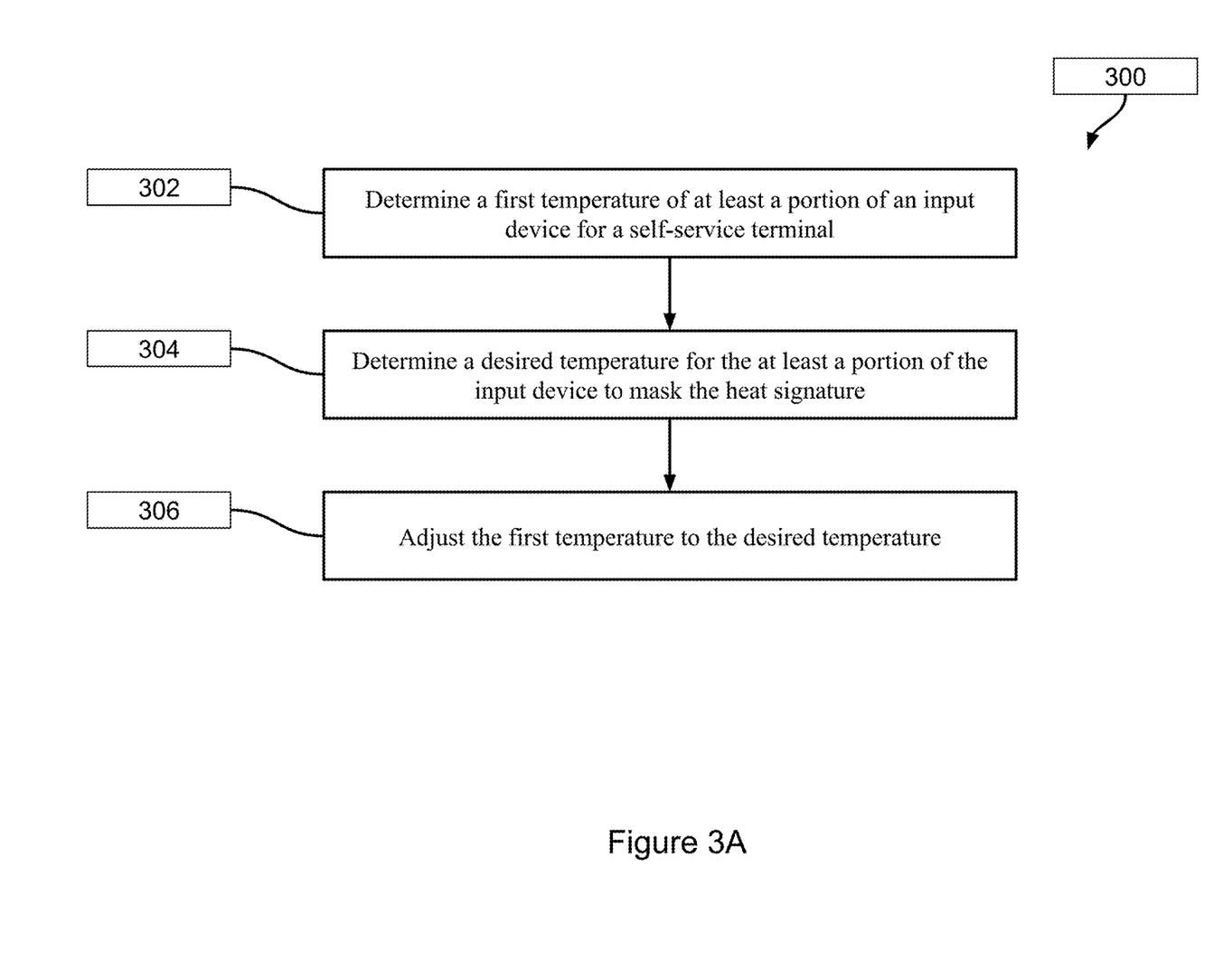
FIG. 3A is a flow chart of an example process for securing user inputs.
Figure 3B:
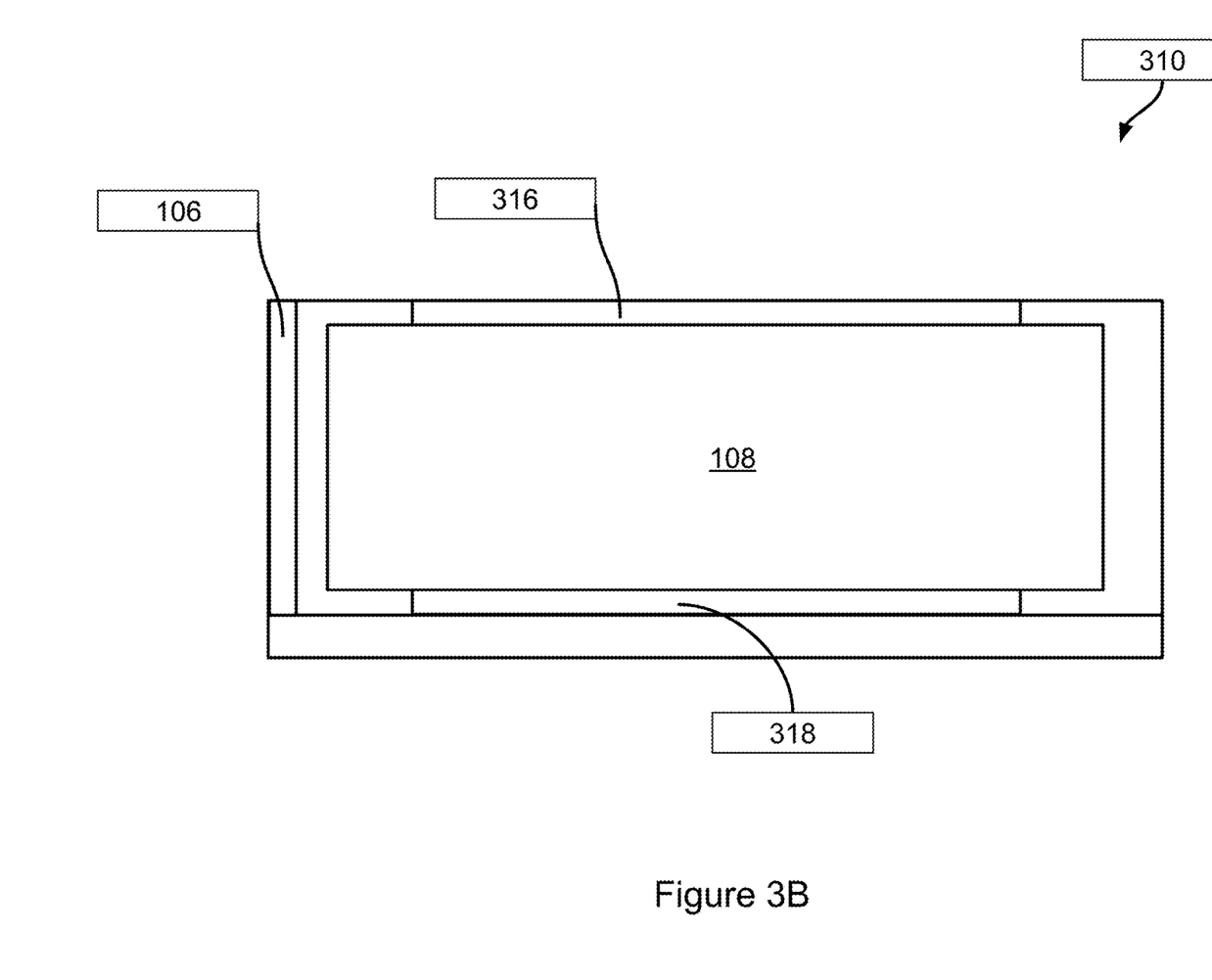
FIG. 3B is a block diagram of an example temperature adjustment device and a temperature determination device.

FIG. 3A is a flow chart of an example process 300 for securing user inputs, and FIG. 3B is a block diagram of an example temperature adjustment device and a temperature determination device, which can be used in some implementations of process 300. For example, process 300 can be used to prevent or reduce the likelihood that a bad actor, through use of a thermal imaging device, can skim information input by the user into a terminal.

A first temperature of at least a portion of an input device for a self-service terminal is determined (302). The first temperature reflects a heat signature on/of the at least a portion of the input device 104 caused by a user's interaction with the input device 104. For example, with reference to FIG. 2B, the first temperature is the temperature of a PIN key (i.e., 6, 9, 5 or 0) resulting from a user pressing/touching that PIN key. In some implementations, the first temperature of each of the keys on the keypad/input device 104, or only each of the pressed keys for a given user input, is determined in response to use of the keypad. In some implementations, the first temperature is not specifically determined, rather the determination is with respect to whether a key's temperature has changed (e.g., above or below a certain threshold) or with respect to whether a key has been depressed (e.g., based on the output of a switch or pressure sensor).

With reference to FIG. 3B, in some implementations, the temperature determination device 106 determines the temperature of the key 310. In some implementations, the temperature determination device 106 is a temperature probe that measures the temperature of the key 310 or determines that the temperature of the key 310 has changed (e.g., beyond a threshold or outside of a range). Each key 310 can, for example, have its own temperature determination device 106. In some implementations, the controller 101 controls and monitors the temperature determination device 106 including determining when to sample the temperature output of the temperature determination device 106 (e.g., during or immediately following a key touch or constantly).

A desired temperature for the at least a portion of the input device to mask the heat signature is determined (304). In some implementations, the desired temperature is the ambient temperature, or the average temperature of the keys or surface of the input device 104. The controller 101 can determine the ambient temperature, for example, by reading the output of a thermometer (e.g., temperature probe) on or proximate to the input device 104 or terminal 100. The controller 101 can determine the average temperature of the keys or surface of the input device 104, for example, by averaging the temperatures of various keys from the respective temperature determination devices 106.

In some implementations, the desired temperature is the temperature of the warmest key (e.g., as a result of a touch), is the same as the first temperature, or is a predetermined temperature such as, for example, a few degrees above the ambient temperature. The desired temperature can also be changed over time, for example, to account for changes in the ambient temperature (or other weather conditions).

In some implementations, the desired temperature is stored by the controller 101. The desired temperature is selected to mask the heat signature left on the input device 104 as a result of a user inputting user information. For example, the desired temperature is selected to cause all of the input device 104 (e.g., keypad) keys to be approximately the same temperature such that the temperature differences across keys described above with reference to FIGS. 2A and 2B cannot be used to determine the user information (e.g., through use of a thermal imaging device). In some implementations, the desired temperature is set by a system administrator, or programmatically determined by the controller 101 (e.g., through software code, scripts or other instructions). For example, with respect to the latter, the controller 101 determines the desired temperature based on pre-existing instructions that account for the time of day, the day of the year, weather conditions, and/or the key material (e.g., plastic or metallic).

The first temperature is adjusted to the desired temperature (306). As described above, the first temperature results from a user touch changing the temperature of the key (e.g., raising or lowering the key temperature), and the desired temperature is one that masks (including reducing the effects of) the heat signature resulting from the user touch(es). In some implementations, the temperature adjustment device 108 adjusts the first temperature to the desired temperature at the direction of the controller 101. For example, the controller 101 determines that the first temperature for a particular key after a user touch is 72 degrees (e.g., through the temperature determination device 106) and the desired temperature is 70 degrees. The controller then determines that the temperature of the key needs to be lowered by two degrees to reach the desired temperature. Accordingly, the controller 101 instructs the temperature adjustment device 108 to lower the key temperature. In some implementations, the controller 101 continues to monitor (e.g., iteratively monitors) the current temperature of the key (e.g., through the temperature determination device 106) and control the operation of the temperature adjustment device 108 until the key temperature is at the desired temperature.

As described above, in some implementations, the desired temperature is set to ambient or the average temperature of the keys or surface of the input device 104 and the first temperature is adjusted to such a desired temperature, as opposed to setting the desired temperature to the warmest key and raising all key temperatures to that of the warmest key. This implementation (e.g., setting the desired temperature to ambient) conserves power relative to some other implementations because the key temperature(s) are brought back to their normal/natural temperature state and not forced to be maintained at an artificially higher temperature state (e.g., a few degrees above ambient or the temperature of the warmest key), which requires more power.

With respect to FIG. 3B, in some implementations the key 310 includes a thermally conductive sheet 316 between the top of the temperature adjustment device 108 and the exterior surface of the key 310, and/or includes a thermal insulator 318 between the bottom of the temperature adjustment device 108 and the lower surface of the key 310 to, for example, reduce the effects of thermal cycling and degradation (e.g., by allowing the temperature adjustment device 108 to freely contract and expand thus minimizing the effect of thermal cycling that causes degradation, which prolongs its operational life), to increase the performance of the temperature adjustment device 108 (e.g., by conducting or insulating the device 108 with regards to thermal energy), and/or to provide mechanical support for the temperature adjustment device 108.

In some implementations the input device 104 is a touchscreen. In such implementations, the touchscreen is heated by the temperature adjustment device 108 to a desired temperature (e.g., one or more degrees above the ambient temperature) to mask user touches that would generally cause the location on the touchscreen touched by a user to be raised by a few degrees. Keeping the touchscreen (e.g., including the touchscreen locations corresponding to all keys) at this elevated temperature masks the user input as the temperature difference between touched locations and non-touch locations is reduced if not eliminated. Without a temperature difference skimming user inputs through use of a thermal imaging device can be prevented (or the success of which reduced). The controller 101 can use the temperature determination device 106 to monitor the temperature of the touchscreen and use the tempera adjustment device 108 to raise or lower the temperature of the touchscreen to the desired temperature.

In some terminals 100 with touchscreens 104, the temperature adjustment device 108 is a thin sheet or film of heating elements embedded in or attached to the touchscreen 104 (e.g., similar to those heating elements used to defrost automobile rear windshields). The temperature adjustment device 108 in some implementations is a device that blows cold or warm air across the surface of the input device 104, or select keys, to change its/their temperature to the desired temperature.

Figure 4A:
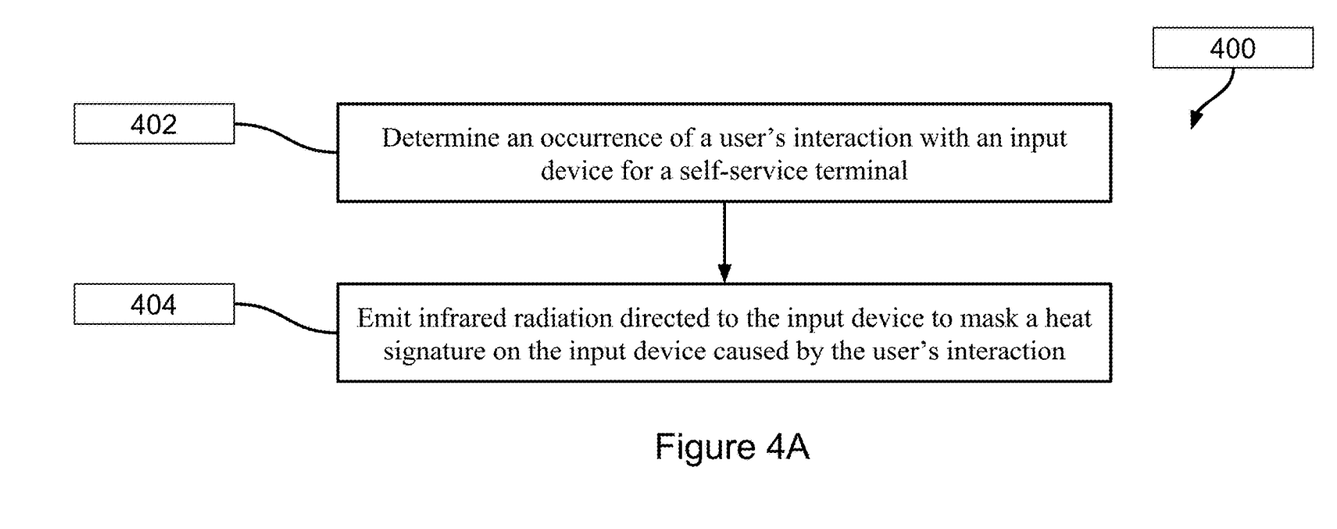
FIG. 4A is a flow chart of another example process for securing user inputs.
Figure 4B:
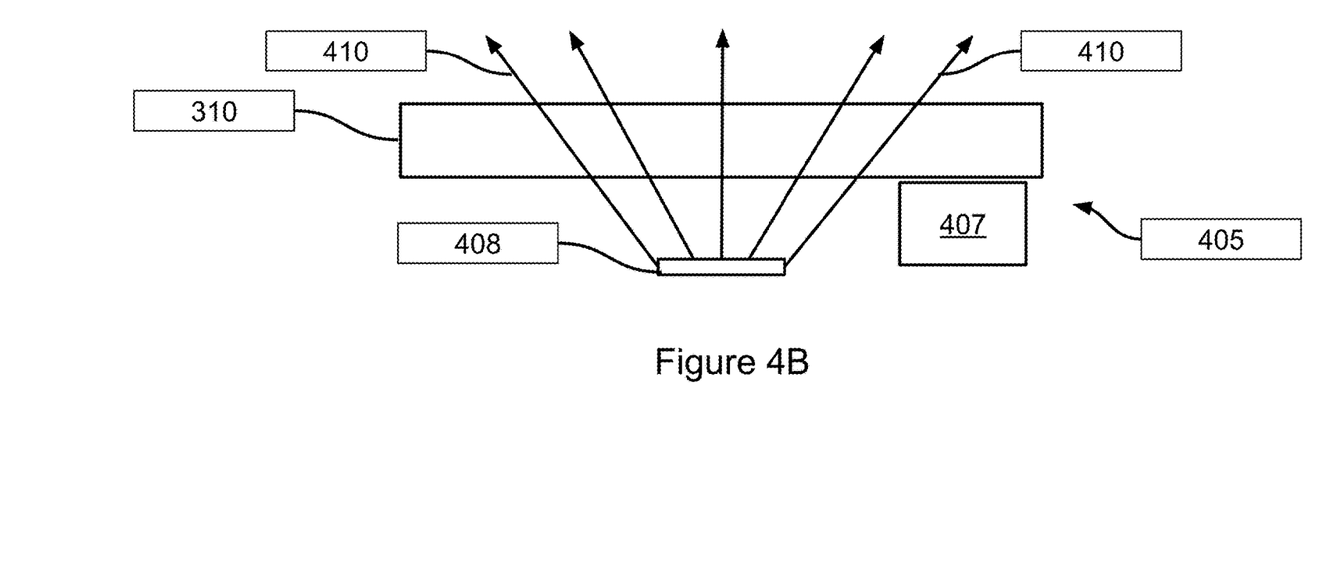
FIG. 4B is a block diagram of an example device for securing user inputs.

Some terminals 100 have input devices 104 with non-metallic keys (e.g., plastic or rubber keys). As compared with metallic keys, non-metallic keys are generally less thermally conductive so more power is required to raise or lower their temperature. Thus, in addition or alternative to adjusting the temperature of the keys to combat skimming, emitting radiation across the input device 104 (e.g., across the touched keys or the entire input device 104) in the light spectrum used by the thermal imaging device can effectively blind the thermal imaging device and obscure the heat signature left by the user touch(es). One such implementation is described with reference to FIGS. 4A and 4B. FIG. 4A is a flow chart of another example process 400 for securing user inputs, and FIG. 4B is a block diagram of an example system 405 for securing user inputs An occurrence of a user's interaction with an input device for a self-service terminal is determined (402). For example, an occurrence of a user's interaction with an input device 104 includes the user pressing a button on a keypad or touching a location on a touchscreen corresponding to a character (e.g., when the user inputs his or her PIN). In some implementations, with reference to FIG. 4B, the touch detection device 407 detects the occurrence of a user interaction. The touch detection device 407 is, for example, a pressure sensor located beneath a key 310 or, in the case of a touchscreen, a capacitive or resistive detection device well-known in the art. The output of the touch detection device 407 can be sensed or sampled by the controller 101, and thus the controller 101 can determine the occurrence of a user interaction/input.

In response to the occurrence of the user's interaction, an infrared radiation directed to the input device is emitted to mask a heat signature on the input device caused by the user's interaction (404). For example, when the controller 101 determines that a user interaction/input has occurred, the controller 101 instructs the emission device 408 to emit light (e.g., rays 410) in the infrared spectrum, e.g., the spectrum used by the thermal imaging device. Doing so effectively blinds the thermal imaging device to the heat signature left on the key(s)/input device 104 by the user touch by obscuring temperature gradients in the region illuminated by the device 408 (e.g., a key or multiple keys). For example, in the visible light spectrum, if an individual is looking at an object and a flashlight is shone in the individual's eyes, the light from the flashlight can blind the individual as to the object. In the infrared spectrum, the same relationship holds true for light emitted by the device 408 and images from the thermal imaging device.

In some implementations, each key 310 or corresponding touchscreen location has an individual device 408 that is separately controlled by the controller 101. In some implementations, one device 408 can service multiple keys or locations and can be positioned such that it is below or within the key 310 and directs light (e.g., rays 410) up through the key 310. The emission device 408 can be, for example, an infrared emitter (e.g., infrared light emitting diode).

In some implementations, the methods described above are performed only when the terminal 100 expects a user input (e.g., to conserve power) and/or only in response to a user input to the input device 104. For example, the controller 101 will not sample the output of the temperature determination device 106 until the terminal expects a user input, for example, after the terminal 100 prompts the user to enter the user's PIN. By way of another example, the temperature adjustment device 108 will not adjust the temperature of any of the keys unless triggered by a user input to the input device 104. In some implementations, the methods are continuously performed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a server, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, software or code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors (e.g., a data processing apparatus) executing one or more computer programs to perform actions by operating on input data and generating output.

Processors suitable for the execution of a computer program include, by way of example, both general and special purpose microprocessors, and any one or more processors of any kind of digital computer (e.g., data processing apparatus). Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) or an LED (light emitting diode) monitor, for displaying information to the user and a keyboard, touchscreen, and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers (e.g., a data processing apparatuses). A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method, comprising:
   determining, by executable instructions that execute on a processor from a non-transitory computer-readable storage medium of a Self-Service Terminal (SST), a first temperature of at least a one button of an input device for the SST, wherein the first temperature reflects a heat signature on the at least a one button of the input device caused by a user's interaction with the least one button of the input device, and obtaining the first temperature from a sensor located beneath the at least one button or from a capacitive or resistive detection device;

determining, executable instructions, a desired temperature for the at least a one button of the input device to mask the heat signature, wherein determining the desired temperature includes determining the desired temperature based on instructions processed by the executable instructions that are configured to change temperatures for the at least one button and other buttons of the input device to a predefined temperature based on the predefined temperature being adjusted for a time of day, a day of year, weather conditions, and a material of the at least one button; and adjusting, by the executable instructions, the first temperature to the desired temperature.

2. The method of claim 1, wherein the one or more buttons are metallic.

3. The method of claim 1, wherein the at least a one button of the input device is a location on a touchscreen.

4. The method of claim 1, wherein the desired temperature is the same as the first temperature and adjusting the first temperature to the desired temperature comprises heating or cooling the at least one button of the input device to the desired temperature.

5. The method of claim 1, wherein determining the first temperature comprises determining the first temperature in response to the user's interaction with the input device.

6. The method of claim 1, wherein the SST is an ATM.

7. The method of claim 1, wherein the SST is a point-of-sale terminal.

8. A computer-implemented method, comprising:

determining, by executable instructions that execute on a processor from a non-transitory computer-readable storage medium of a Self-Service Terminal (SST), an occurrence of a user's interaction with a number of buttons of an input device for the SST based on a change in heat detected from the user's interaction with the number of buttons relative to a computed desired temperature that is based on instructions processed by the executable instructions that adjust a predetermined temperature representing the desired temperature in order to account for a time of day, a day of year, weather conditions, and materials of the number of buttons; and in response to the occurrence of the user's interaction with the number of the buttons, emitting, by the executable instructions causing the emitting of, infrared radiation directed to the buttons of the input device to mask a heat signature on the number of the buttons of the input device caused by the user's interaction.

9. The method of claim 8, wherein the input device is a keypad with a non-metallic button and the user's interaction is with the non-metallic button.

10. The method of claim 9, wherein emitting infrared radiation directed to the buttons of the input device comprises emitting infrared radiation from underneath and through the non-metallic button.

11. A system, comprising:

a self-service terminal (SST) comprising:

an input device including buttons configured to accept a user input through a number of the buttons to facilitate a transaction;

a temperature determination device configured to determine temperature information of the buttons of the input device; and a temperature adjustment device including a non-transitory computer-readable storage medium having executable instructions and a processor, wherein the executable instructions executed on the processor from the non-transitory computer-readable storage medium and configured to perform processing to:

adjust a temperature of the buttons of the input device to a desired temperature to mask a heat signature on the number of the buttons of the input device caused by the user input;

wherein the adjust processing further includes processing to: determine the desired temperature and change a predetermined temperature that represents the desired temperature by processing instructions that adjust the predetermined temperature based on a time of day, a day of year, weather conditions, and materials of the buttons.

12. The system of claim 11, wherein the temperature adjustment device comprises a Peltier device.

13. The system of claim 11, wherein the executable instructions further configured to perform processing to: heat and cool the at least a portion of the input device.

14. The system of claim 11, wherein the SST is an Automated Teller Machine (ATM) or a point-of-sale (POS) terminal.

* * * * *